(12) United States Patent
Atake et al.

(10) Patent No.: US 8,535,595 B2
(45) Date of Patent: Sep. 17, 2013

(54) EMBOSSED DECORATIVE INJECTION-MOLDED PRODUCT AND METHOD OF MANUFACTURING THE SAME

(75) Inventors: Hiroyuki Atake, Tokyo (JP); Yoshiyuki Meiki, Saitama (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 13/479,072

(22) Filed: May 23, 2012

(65) Prior Publication Data

US 2012/0228809 A1 Sep. 13, 2012

Related U.S. Application Data

(62) Division of application No. 12/439,849, filed as application No. PCT/JP2007/068839 on Sep. 27, 2007, now abandoned.

(30) Foreign Application Priority Data

Sep. 28, 2006 (JP) ................................. 2006-263913

(51) Int. Cl.
*B29C 51/10* (2006.01)
(52) U.S. Cl.
USPC ............ 264/511; 264/510; 264/571; 264/320
(58) Field of Classification Search
None
See application file for complete search history.

(56) References Cited

U.S. PATENT DOCUMENTS

| | | | |
|---|---|---|---|
| 5,759,684 | A | 6/1998 | Atake |
| 2002/0142181 | A1 | 10/2002 | Atake |
| 2005/0011808 | A1 | 1/2005 | Pylant et al. |

FOREIGN PATENT DOCUMENTS

| | | |
|---|---|---|
| JP | 1-166958 | 6/1989 |
| JP | 07-032476 | 2/1995 |
| JP | 07-032548 | 2/1995 |
| JP | 2001-138468 | 5/2001 |
| JP | 2002-240078 | 8/2002 |
| JP | 2002-264268 | 9/2002 |
| JP | 2006-095837 | 4/2006 |
| JP | 2006-142698 | 6/2006 |

OTHER PUBLICATIONS

Japanese Official Action dated Sep. 6, 2011, for JP 2007-251349.

*Primary Examiner* — Monica Huson
(74) *Attorney, Agent, or Firm* — Antonelli, Terry, Stout & Kraus, LLP.

(57) ABSTRACT

The present invention relates to a decorated injection molded article having an embossed pattern comprising a surface layer comprising an acryl resin film, a printing layer provided on an inside of the surface layer, an adhesive layer provided on an inside of the printing layer and an injected resin layer, wherein a concavo-convex pattern is provided on the surface of the surface layer at a front face part and a side face part of the injection molded article by emboss processing and further to a method for producing the same, and the present invention provides a decorated injection molded article having an embossed pattern, in which a concavo-convex pattern is easily formed on the surface and which is imparted with a steric design property having a higher grade feeling.

10 Claims, 2 Drawing Sheets

EMBOSSED DECORATIVE INJECTION-MOLDED PRODUCT AND METHOD OF MANUFACTURING THE SAME

This application is a Divisional application of prior application Ser. No. 12/439,849 filed Mar. 4, 2009, now abandoned the contents of which are incorporated herein by reference in their entirety. Ser. No. 12/439,849 is a National Stage Application, filed under 35 USC 371, of International (PCT) Application No. PCT/JP2007/068839, filed Sep. 27, 2007.

BACKGROUND OF THE INVENTION

The present invention relates to a decorated injection molded article having an embossed pattern which is provided on a surface with a concavo-convex pattern by emboss processing.

RELATED ART

Injection molded articles which are decorated by laminating a decorative sheet as an adherend on a surface of molded resin articles to integrate with them are used for various uses. In order to enhance a design property of these injection molded articles, it has been widely carried out to provide a concavo-convex pattern such as wood grain conduit grooves and the like to give a steric design feeling.

Known as a method for providing the concavo-convex pattern is a method in which a base film of an ionizing radiation-curable resin or a thermosetting resin is subjected to emboss processing by applying hot pressing to form a concavo-convex pattern to thereby produce a decorative sheet and in which it is used for forming an internal concavo-convex pattern of injection molded articles (refer to, for example, a patent document 1).

Further, proposed as well is a method in which a curable resin is coated on a base film and then cured to prepare an uneven film having a concavo-convex pattern formed thereon and in which the uneven film is used to provide a concavo-convex pattern on the surface of an injection molded article.

However, when a decorative sheet in which a concavo-convex pattern is formed on an outside surface of a base film coated with a curable resin is used for injection molding, there have been the problems that if a curing degree of the curable resin is too low, an uneven form of the embossed a concavo-convex pattern is liable to disappear by hot pressing when preliminarily molding the decorative sheet at a vacuum molding step and hot pressing at a subsequent injection molding step and if it is too high, deformation and cracks are liable to be produced and that the workability at the vacuum molding step and the injection molding step is deteriorated as well.

Further, it is possible as well to form a concavo-convex pattern on the surface of an injection molded article by subjecting a cavity surface of an injection molding die to engraving. However, there is the problem that if an angle formed by a front face part and a side face part of the injection molding die is close to a right angle, it becomes difficult to draw the injection molded article from the die, and involved therein is the demerit that it is not suited for production of a wide variety of products in small quantities since the injection molding die is worked.

Accordingly, techniques for forming a concavo-convex pattern on the surfaces of injection molded articles in a simple manner have been required.

Patent document 1: Japanese Patent Application Laid-Open No. 32548/1995
Patent document 2: Japanese Patent Application Laid-Open No. 32476/1995
Patent document 3: Japanese Patent Application Laid-Open No. 240078/2002

DISCLOSURE OF THE INVENTION

In light of the situation described above, an object of the present invention is to provide an injection molded article in which a concavo-convex pattern is formed on the surface in a simple manner and which is imparted with a steric design property having a higher grade feeling.

Intensive researches repeated by the present inventors in order to achieve the object described above have resulted in finding that the object described above can be achieved by providing a concavo-convex pattern on the surfaces of a front face part and a side face part of an injection molded article by specific emboss processing. The present invention has been completed based the above knowledge.

That is, the present invention comprises the following essential points.

1. A decorated injection molded article having an embossed pattern, comprising a surface layer comprising an acryl resin film, a printing layer provided on an inside of the surface layer, an adhesive layer provided on an inside of the printing layer and an injected resin layer, wherein a concavo-convex pattern is provided on a surface of the surface layer at a front face part and a side face part of the injection molded article by emboss processing.
2. The decorated injection molded article having an embossed pattern as described in the above item 1, wherein the printing layer comprises a colored solid layer.
3. The decorated injection molded article having an embossed pattern as described in the above item 2, wherein the printing layer further comprises a picture layer.
4. The decorated injection molded article having an embossed pattern as described in any of the above items 1 to 3, wherein the printing layer comprises a light reflective layer.
5. The decorated injection molded article having an embossed pattern as described in any of the above items 1 to 4, wherein an angle θ obtained by deducting 90° from an angle formed by a front face part and a side face part of the injection molded article exceeds 0° and is 5° or less.
6. A method for producing a decorated injection molded article having an embossed pattern, comprising a decorative sheet comprising a surface layer comprising an acryl resin film, a printing layer provided on an inside of the surface layer and an adhesive layer provided on an inside of the printing layer and an injected resin layer formed in an inside of the decorative sheet, comprising:
   a step of subjecting the surface layer of the decorative sheet to emboss processing at a temperature of 150° C. or higher to form a concavo-convex pattern,
   a step of vacuum-molding the decorative sheet at a temperature of 90 to 110° C. so that the surface layer faces to an injection molding die side and
   a step of injecting a resin to the decorative sheet vacuum-molded to form the injected resin layer.
7. The method for producing a decorated injection molded article having an embossed pattern as described in the above item 6, wherein the printing layer comprises a colored solid layer.

8. The method for producing a decorated injection molded article having an embossed pattern as described in the above item 7, wherein the printing layer further comprises a picture layer.
9. The method for producing a decorated injection molded article having an embossed pattern as described in any of the above items 6 to 8, wherein the printing layer comprises a light reflective layer.
10. The method for producing a decorated injection molded article having an embossed pattern as described in any of the above items 6 to 9, wherein an angle θ obtained by deducting 90° from an angle formed by a front face part and a side face part of the injection molding die exceeds 0° and is 5° or less.

The production process for a decorated injection molded article having an embossed pattern as described in any of the above items 6 to 9, wherein an angle θ obtained by deducting 90° from an angle formed by a front face part and a side face part of the injection molding die exceeds 0° and is 5° or less.

EXPLANATION OF THE CODES

Figure 1:
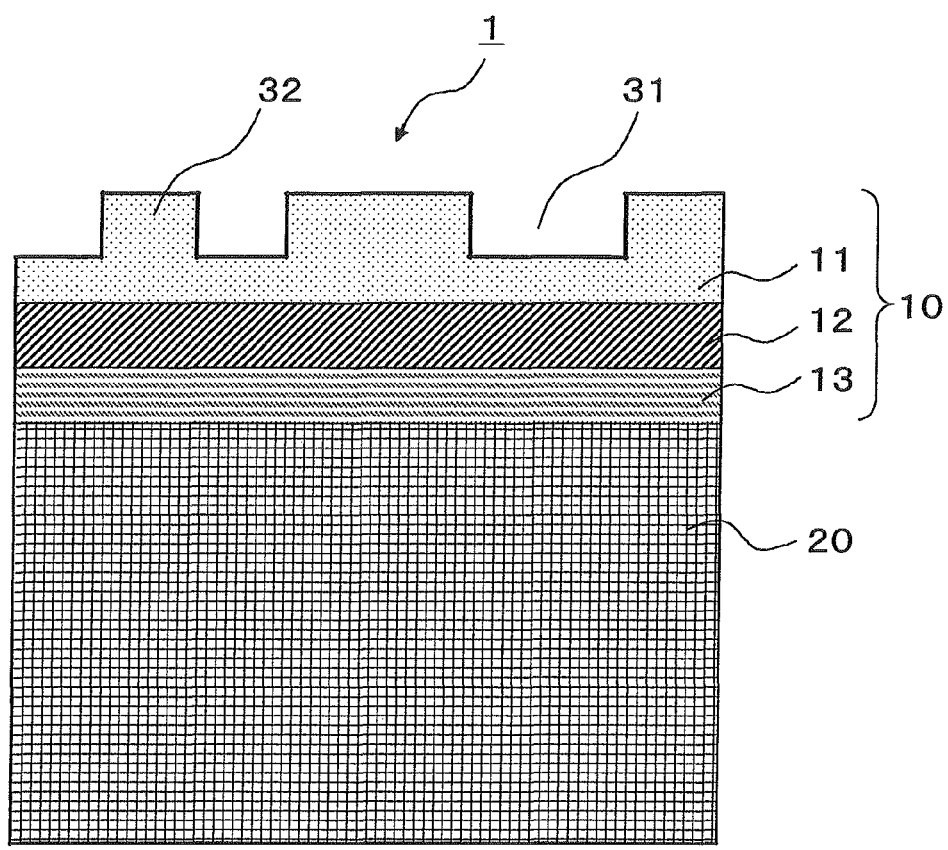
FIG. 1 is a cross-sectional schematic drawing of the decorated injection molded article having an embossed pattern of the present invention.

1 Decorated injection molded article having an embossed pattern
10 Decorative sheet
11 Surface layer
12 Printing layer
13 Adhesive layer
20 Injected resin layer
31 Concave part on the surface of the surface layer
32 Convex part on the surface of the surface layer
41 Injection molding die (male die)
42 Injection molding die (female die)
43 Suction hole
44 Injected resin
45 Sheet clamp
46 Front face part of the die
47 Side face part of the die

BEST MODE FOR CARRYING OUT THE INVENTION

The present invention shall be explained below with reference to the drawings. FIG. 1 is a cross-sectional schematic drawing of the decorated injection molded article having an embossed pattern of the present invention.

As shown in FIG. 1, in the decorated injection molded article having an embossed pattern 1 of the present invention, a surface layer 11, a printing layer 12, an adhesive layer 13 and an injected resin layer 20 are provided in this order from a surface side. Among them, the surface layer 11, the printing layer 12 and the adhesive layer 13 constitute a decorative sheet 10.

A concavo-convex pattern is provided on the surface of the surface layer 11 by emboss processing. A concave part 31 and a convex part 32 are formed by the concavo-convex pattern provided on the surface of the surface layer 11. The decorated injection molded article having an embossed pattern 1 of the present invention has a concavo-convex pattern formed by emboss processing on the surfaces of a front face part and a side face part thereof. The concavo-convex pattern provided not only on the surface of the front face part but also on the surface of the side face part makes it possible to obtain an injection molded article imparted with a steric design property having a higher grade feeling.

An acryl resin film which is excellent in transparency and can provide an excellent coating feeling as a result thereof is used as the surface layer 11 in the decorated injection molded article having an embossed pattern 1 of the present invention. A thickness of the resin film is preferably about 20 to 500 μm, more preferably about 50 to 150 μm.

Acryl resins such as, for example, polymethyl (meth)acrylate, polyethyl (meth)acrylate, polybutyl (meth)acrylate, methyl (meth)acrylate-butyl (meth)acrylate copolymers, methyl (meth)acrylate-styrene copolymers and the like (in the above case, (meth)acrylate shows acrylate or methacrylate) are used as the acryl resin in the form of a single compound or a mixture of two or more kinds thereof and in the form of a film of a single layer or a layered body having two or more layers. The surface layer 11 may be translucent, but it is preferably transparent since it allows coloring of the printing layer 12 to look brilliant. When it is transparent, it may be transparent and colored as well as transparent and colorless. Various additives including delusterants, lubricants such as polyethylene waxes, paraffin waxes and the like, UV absorbers such as benzotriazole bases, benzophenone bases, fine particle cerium oxide bases and the like, light stabilizing agents such as hindered amine base radical scavengers and the like, plasticizers, colorants and the like may suitably be added, if desired, to the resin film of the surface layer 11 in order to control the physical properties.

The printing layer 12 in the decorated injection molded article having an embossed pattern 1 of the present invention has preferably a colored solid layer and has particularly preferably a picture layer in addition to the colored solid layer from the viewpoint of enhancing the design property. Usually, the picture layer is coated outside (closer to the surface side than the colored solid layer) the colored solid layer.

Basically, the colored solid layer and the picture layer shall not specifically be restricted, except that a resin for the binder is constituted from specific resins and that suitable colorants are blended in order to obtain the desired colors. Usually, the colored solid layer and the picture layer are formed by a publicly known method such as gravure printing using a print ink, letterpress printing, silk screen printing, offset printing, ink jet printing and the like. Further, the colored solid layer may be coated by a publicly known coating method such as roll coating and the like.

Those suitably selected from publicly known ones considering an adhesive property and the like are used for an ink (or a coating liquid) used for forming the printing layer 12. For example, acryl resins, vinyl chloride-vinyl acetate copolymers, polyester resins, polyurethane resins and the like are usually used as the resin for the binder of the ink (or the coating liquid). Among them, the resins for the binder comprising the acryl resins alone or the mixtures of the acryl resins and the vinyl chloride-vinyl acetate copolymers as a main component are more preferred. When the acryl resin is used for the surface layer 11, the acryl resin is used in order to bring out an adhesive property with the surface layer 11, and if it is further mixed with the vinyl chloride-vinyl acetate copolymer or a different acryl resin, the printing aptitude and the molding aptitude become further suitable.

In this regard, the acryl resin is suitably selected from the same resins as cited in the surface layer described above, and in addition thereto, capable of being used as well are acryl polyols obtained by copolymerizing (meth)acrylic acid alkyl esters such as methyl (meth)acrylate, ethyl (meth)acrylate, butyl (meth)acrylate, 2-ethylhexyl (meth)acrylate, octyl (meth)acrylate and the like with (meth)acrylic acid esters having a hydroxy group in a molecule such as 2-hydroxyethyl (meth)acrylate, 2-hydroxybutyl (meth)acrylate, 2-hydroxy-3-phenoxypropyl (meth)acrylate and the like.

Further, resins having a vinyl acetate content of about 5 to 20 mass % and an average polymerization degree of about 350 to 900 are usually used as the vinyl chloride-vinyl acetate copolymer resin. The vinyl chloride-vinyl acetate copolymer resin may be further copolymerized, if desired, with carboxylic acid such as maleic acid, fumaric acid and the like. A mixing ratio of the acryl resin to the vinyl chloride-vinyl acetate copolymer resin is the acryl resin/the vinyl chloride-vinyl acetate copolymer resin=about 1/9 to 9/1 (mass ratio). In addition thereto, other resins, for example, resins such as thermoplastic polyester resins, thermoplastic urethane resins and chlorinated polyolefin resins such as chlorinated polyethylene, chlorinated polypropylene and the like may suitably be mixed, if desired, as a resin of an accessory component.

Used as a colorant added to the ink (or the coating liquid) are, for example, inorganic pigments such as titan white, zinc oxide, carbon black, iron black, iron oxide red, cadmium red, ultramarine blue, cobalt blue, chrome yellow, titan yellow and the like, organic pigments such as phthalocyanine blue, indathrene blue, isoindolinone yellow, quinacridone red, perylene red and the like, metallic pigments such as powders or scales of metals such as aluminum, brass and the like, pearl pigments such as powders or scales of titanium dioxide-covered mica and the like and dyes.

Pictures of the picture layer are, for example, wood grain patterns, marble grain patterns, sand grain patterns, texture grain patterns, leather drawing patterns, tiling patterns, bricklaying patterns, geometric graphics, characters, marks and the like.

The printing layer 12 may comprise, if desired, a functional layer such as a light reflective layer, a magnetic substance layer, a conductive layer and the like. In this regard, the light reflective layer includes, for example, a metal thin film layer which is wholly or partially formed by depositing metal (aluminum, chromium, silver and the like) on the surface of a resin film and a resin film provided on a surface with a white coating film or a metallic coating film (using an ink containing metal such as aluminum, chromium, silver and the like) which is excellent in a reflectance. When the light reflective layer is formed on the whole surface of the printing layer 12, it is a colored solid layer, and when it is formed partially on the printing layer 12, it is a picture layer. A magnetic substance is contained in the magnetic substance layer, and a conductive material is contained in the conductive layer.

Further, publicly known resins such as thermoplastic resins, thermosetting resins and the like as a thermosensitive adhesive are used for the adhesive layer 13 in the decorative sheet 10. A single compound or a mixture of two or more kinds of, for example, acryl resins, chlorinated polyolefin resins, polyvinyl chloride-polyvinyl acetate copolymers, thermoplastic urethane resins, thermoplastic polyester resins, polyamide resins, rubber base resins and the like is used for the thermoplastic resins. Also, urethane resins, epoxy resins and the like are used for the thermosetting resins.

The adhesive layer 13 is formed by coating an adhesive comprising the resins by a publicly known printing or coating method such as gravure printing, roll coating and the like. A thickness of the adhesive layer 13 shall not specifically be restricted, and it is usually about 1 to 20 μm, preferably about 1 to 10 μm.

In a process for producing the decorative sheet 10 used for the decorated injection molded article having an embossed pattern 1 of the present invention, the printing layer 12 is printed or coated in the order of the picture layer and the colored solid layer on a rear face of the resin film which is the surface layer 11, and then the adhesive layer 13 is coated thereon.

Basically, a resin used for the injected resin layer 20 in the decorated injection molded article having an embossed pattern 1 of the present invention shall not specifically be restricted and may be publicly known resins. It may be selected according to physical properties required to the products, the costs and the like. If it is a thermoplastic resin, it includes ABS (acrylonitrile-butadiene-styrene copolymer) resins, polycarbonate resins, styrene resins, acryl resins, vinyl chloride resins, polyolefin resins and the like. If it is a thermosetting resin, it includes resins of a two liquid curing type, for example, uncured resin liquids of urethane resins, unsaturated polyester resins, epoxy resins and the like. The thermoplastic resin is molten by heating and injected in a fluid state, and the thermosetting resin (uncured resin thereof) is injected at room temperature or in a fluid state by suitably heating.

Resins colored by adding colorants may suitably be used for the injected resin according to the uses. The publicly known colorants described in the foregoing printing layer 12 can be used for the colorant. Further, publicly known various additives including inorganic powders of silica, alumina, talc, calcium carbonate, aluminum oxide and the like, fillers such as glass fibers and the like, stabilizing agents, lubricants and the like may suitably be added, if desired, to the injected resin.

In order to provide the surface of the decorated injection molded article having an embossed pattern 1 of the present invention with a concavo-convex pattern, first, a side of the surface layer 11 in the decorative sheet 10 is provided with a concavo-convex pattern by a publicly known emboss processing method. This emboss processing step is carried out at a temperature of preferably 150° C. or higher, more preferably 150 to 260° C., further preferably 160 to 250° C. and particularly preferably 200 to 240° C. This is to allow the acryl resin film constituting the surface layer 11 to be quickly processed. In this connection, "a temperature of the emboss processing step is 150° C." means that a temperature of the decorative sheet 10 before provided with the concavo-convex pattern in processing is 150° C. A temperature of the emboss gravure in processing may be about 90° C.

The emboss processing is carried out by suitably controlling a depth so that a design property of the concavo-convex pattern is enhanced. Accordingly, it may be carried out in a depth falling in a range of a depth of the surface layer 11 or in a depth in which the printing layer 12 and the adhesive layer 13 are provided as well with the concavo-convex pattern.

Figure 2:
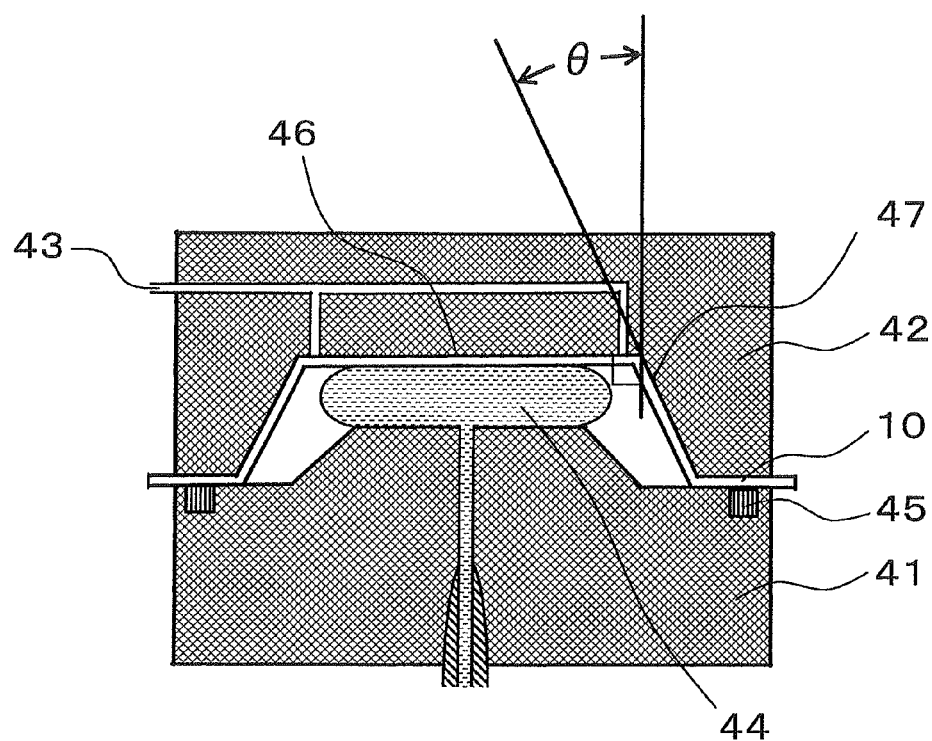
FIG. 2 is a conceptual drawing explaining one embodiment of a production process for the concavo-convex decorated injection molded article of the present invention.

FIG. 2 is a conceptual drawing explaining one embodiment (thermoject molding) of the concavo-convex decorated injection molded article of the present invention. An injection molding die comprises an injection molding die (male die) 41 and an injection molding die (female die) 42. In the vacuum molding step, the decorative sheet 10 subjected to emboss processing in the manner described above is heated to a prescribed temperature and pressed and fixed onto the injection molding die (female die) 42 by means of a sheet clamp 45, and then the decorative sheet is vacuumed from a suction hole 43 to complete prescribed dieing. In the injection molding step immediately after that, an injected resin 44 is injected into the injection molding die to form an injected resin layer 20. After completing injection molding and cooling, the decorated injection molded article having an embossed pattern 1 is taken out from the injection molding die.

The decorative sheet 10 subjected to emboss processing at a temperature of 150° C. or higher as described above is preferably mounted in the injection molding die so that the surface layer 11 which is an emboss processing side faces to an injection molding die side, and it is preferably subjected to vacuum molding at a temperature of 90 to 110° C. If the temperature falls in the range described above, the concavo-convex pattern formed on the decorative sheet 10 is maintained as well in the vacuum molding step.

After the vacuum molding step described above, the resin is injected to the decorative sheet 10 subjected to vacuum molding to form an injected resin layer. A temperature of the injected resin is suitably selected according to a melting point and a softening point of the resin.

Even in a case where emboss processing is carried out deeply up to an adhesive layer 13 face of the decorative sheet 10 and where a temperature of the injected resin is high, the injected resin is filled immediately into the concave parts on the adhesive layer 13 face, and therefore the concavo-convex form of the embossed concavo-convex pattern is maintained. As heat transferred to the decorative sheet 10 when a temperature of the injected resin is high is moved immediately to the injection molding die, a temperature of the surface layer 11 in the decorative sheet 10 is maintained in a lower level as compared with a temperature of the injected resin, and the uneven form of the concavo-convex pattern on the surface layer 11 face of the decorative sheet 10 is maintained as well.

In FIG. 2, even when an angle obtained by deducting 90° from an angle θ formed by a front face part 46 and a side face part 47 of the injection molding die, that is, an angle θ (hereinafter referred to as a drawing angle θ) obtained by deducting 90° from an angle formed by a front face part and a side face part of the injection molded article exceeds 0° and is 5° or less, the decorated injection molded article having an embossed pattern of the present invention can be drawn from the die, and therefore injection molded articles having such form, that can not produce injection molded articles when a concavo-convex pattern is formed by engraving on a surface, can be produced as well.

EXAMPLES

Next, the present invention shall be explained in further details with reference to examples, but the present invention shall by no means be restricted by these examples.

Example 1

A picture layer comprising a polybutyl methacrylate/vinyl chloride-vinyl acetate copolymer (mass ratio: 2/1) composition was gravure-printed on a rear face of a resin film (film thickness: 125 μm) comprising an acryl resin (methyl methacrylate resin), and a metallic coating film was gravure-printed on a part of the portion where the picture layer was not printed to prepare a light reflective layer. A colored solid layer containing a composition obtained by adding high masking pigments (titan white and a colored pigment) to the same composition as in the picture layer was coated thereon by roll coating, and an adhesive layer comprising an acryl resin was further coated thereon by roll coating. Then, the film was dried to obtain a decorative sheet.

A concavo-convex wood grain pattern having an average emboss depth of 70 μm was formed on a surface layer side of the decorative sheet by means of a metal-made emboss roller while controlling a temperature of the sheet just before forming the concavo-convex pattern to 200 to 240° C. and a temperature of an emboss gravure to about 90° C.

The decorative sheet was heated to 100° C. and subjected to vacuum molding in an injection molding die (die temperature: 60° C.), and it was brought into tight contact with an injection molding die (female die) so that the concavo-convex pattern formed by emboss processing was provided on both of a front face part and a side face part of a molding. Then, an ABS resin was injected at a resin pressure of 350 kg/cm$^2$ and a resin temperature of 230° C. in an injection molding step to apply heat and pressure onto the decorative sheet. This allowed resin heat to move to the die at the moment that the resin was brought into contact with the die, and therefore the surface of the decorative sheet was 100° C. After cooling down, a decorated injection molded article having an embossed pattern was taken out from the injection molding die. A drawing angle θ of the injection molded article was 1°, but it was drawn well from the die. The appearance of the decorated injection molded article having an embossed pattern thus obtained was visually observed.

In the decorated injection molded article having an embossed pattern obtained in Example 1, a concavo-convex wood grain pattern was displayed sterically on both of a front face part and a side face part of the molding, and the pattern looked as if it stood out and was provided with a high-grade feeling.

Comparative Example 1

The decorative sheet obtained in Example 1 in which a concavo-convex wood grain pattern having an average emboss depth of 70 μm was formed was heated to 80° C. and subjected to vacuum molding in an injection molding die (die temperature: 60° C.), and it was brought into tight contact with an injection molding die (female die) so that the concavo-convex pattern formed by emboss processing was provided on both of a front face part and a side face part of a molding. Then, an ABS resin was injected at a resin pressure of 350 kg/cm$^2$ and a resin temperature of 230° C. in an injection molding step to apply heat and pressure onto the decorative sheet. This allowed resin heat to move to the die at the moment that the resin was brought into contact with the die, and therefore the surface of the decorative sheet was 80° C. Since the surface of the decorative sheet was 80° C. in injection molding, the decorative sheet was not elongated and therefore did not fit the die, and cracks were produced in injection molding. Accordingly, a desired embossed decorated injection molded article was not obtained.

Comparative Example 2

The decorative sheet obtained in Example 1 in which a concavo-convex wood grain pattern having an average emboss depth of 70 μm was formed, heated to 140° C. and subjected to vacuum molding in an injection molding die (die temperature: 60° C.), and it was brought into tight contact with an injection molding die (female die) so that the concavo-convex pattern formed by emboss processing was provided on both of a front face part and a side face part of a molding. Then, an ABS resin was injected at a resin pressure of 350 kg/cm$^2$ and a resin temperature of 230° C. in an injection molding step to apply heat and pressure onto the decorative sheet. This allowed resin heat to move to the die at the moment that the resin was brought into contact with the die, and therefore the surface of the decorative sheet was 140°

C. After cooling down, a decorated injection molded article having an embossed pattern was taken out from the injection molding die. A drawing angle θ of the injection molded article was 1°, but it was drawn well from the die. The appearance of the decorated injection molded article having an embossed pattern thus obtained was visually observed.

The decorated injection molded article having an embossed pattern obtained in Comparative Example 2 scarcely had a concavo-convex wood grain pattern since a temperature of the decorative sheet was high, and it was inferior in a design property and far from a decorated injection molded article having an embossed pattern.

Industrial Applicability

The present invention can provide a decorated injection molded article having an embossed pattern in which a concavo-convex pattern is easily formed on a surface and which is imparted with a steric design property having a higher grade feeling, and therefore it is suitably used for various interior parts for automobiles, interior parts for buildings and houses, high-grade miscellaneous daily goods and the like.

What is claimed is:

1. A method for producing a decorated injection molded article having an embossed pattern, the decorated injection molded article comprising a decorative sheet comprising a surface layer comprising an acryl resin film, the surface layer forming both a front surface part and a side surface part of the injection molded article, the embossed pattern being provided on the surface layer on both said front surface part and said side surface part, a printing layer provided on an inside of the surface layer, and an adhesive layer provided on an inside of the printing layer, and an injected resin layer formed in an inside of the decorative sheet, the method comprising:

a step of subjecting the surface layer of the decorative sheet, at both said front surface part and said side surface part, to emboss processing at a temperature of 150° C. to 260° C. to form a concavo-convex pattern at both said front surface part and said side surface part, a step of vacuum-molding the decorative sheet at a temperature of 90 to 110° C. so that the surface layer faces to an injection molding die side, and a step of injecting a resin to the decorative sheet vacuum-molded, to form the injected resin layer, wherein a temperature of the surface layer of the decorative sheet is maintained lower than a temperature of the resin being injected.

2. The method for producing a decorated injection molded article having an embossed pattern as described in claim 1, wherein the printing layer comprises a colored solid layer.

3. The method for producing a decorated injection molded article having an embossed pattern as described in claim 2, wherein the printing layer further comprises a picture layer.

4. The method for producing a decorated injection molded article having an embossed pattern as described in claim 1, wherein the printing layer comprises a light reflective layer.

5. The method for producing a decorated injection molded article having an embossed pattern as described in claim 1, wherein an angle θ obtained by deducting 90° from an angle formed by a front face part and a side face part of the injection molding die exceeds 0° and is 5° or less.

6. The method for producing a decorated injection molded article having an embossed pattern as described in claim 1, wherein in the step of injecting resin, heat transferred to the decorative sheet when a temperature of the injected resin is higher than that of the surface layer of the decorative sheet is moved to the injection molding die.

7. The method for producing a decorated injection molded article having an embossed pattern as described in claim 1, wherein the adhesive layer face has concave parts.

8. The method for producing a decorated injection molded article having an embossed pattern as described in claim 1, wherein the decorative sheet subjected to emboss processing is heated at the temperature of 90 to 110° C., fixed onto the female die part of the injection molding die, by means of a sheet clamp, and vacuumed from a suction hole to complete prescribed dieing, in the step of vacuum-molding the decorative sheet.

9. The method for producing a decorated injection molded article having an embossed pattern as described in claim 1, wherein the decorative sheet subjected to emboss processing is heated at the temperature of 90 to 110° C., subjected to vacuum molding in the female die part of the injection molding die, and the concavo-convex pattern formed by emboss processing is brought into contact with the female die part of the injection die.

10. The method for producing a decorated injection molded article having an embossed pattern as described in claim 1, wherein said step of emboss processing is conducted at a temperature of 200° C. to 240° C.

* * * * *